(12) United States Patent
Ruggiero et al.

(10) Patent No.: US 8,792,753 B2
(45) Date of Patent: Jul. 29, 2014

(54) METHOD AND SYSTEM FOR A FIBER OPTIC SENSOR

(75) Inventors: Eric John Ruggiero, Niskayuna, NY (US); Thomas Lowell Steen, Niskayuna, NY (US); Brian Allen Czapor, North Royalton, OH (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 13/174,383

(22) Filed: Jun. 30, 2011

(65) Prior Publication Data

US 2013/0004116 A1    Jan. 3, 2013

(51) Int. Cl.
*G02B 6/00*        (2006.01)
*B23P 11/02*      (2006.01)

(52) U.S. Cl.
USPC ................... 385/12; 29/446; 285/37

(58) Field of Classification Search
None
See application file for complete search history.

(56) References Cited

U.S. PATENT DOCUMENTS

| | | | |
|---|---|---|---|
| 6,049,650 A * | 4/2000 | Jerman et al. ................. | 385/137 |
| 6,687,450 B1 * | 2/2004 | Kempeneers et al. ........ | 385/135 |
| 7,333,709 B2 * | 2/2008 | Carpenter et al. ............ | 385/136 |
| 7,551,288 B1 | 6/2009 | Discenzo | |
| 2003/0063890 A1 * | 4/2003 | Wu et al. ....................... | 385/137 |
| 2003/0086675 A1 * | 5/2003 | Wu et al. ....................... | 385/137 |
| 2009/0074371 A1 * | 3/2009 | Bayazit et al. ................ | 385/135 |
| 2010/0142880 A1 | 6/2010 | Rodriguez et al. | |
| 2011/0102765 A1 | 5/2011 | Ruggiero et al. | |
| 2011/0211801 A1 * | 9/2011 | McGranahan et al. ....... | 385/136 |
| 2011/0268413 A1 * | 11/2011 | Cote et al. .................... | 385/135 |

* cited by examiner

*Primary Examiner* — Tina Wong
(74) *Attorney, Agent, or Firm* — William Scott Andes, Esq.; Armstrong Teasdale LLP

(57) ABSTRACT

A system and method for assembling a fiber optic sensor assembly are provided. The fiber optic sensor system includes a fiber optic cable and a carrier including a first connection end and a second connection end joined together by one or more breakaway tabs, the first connection end including a first fiber attach point configured to secure a distal end of the fiber optic cable to the first connection end, the second connection end including a second fiber attach point configured to secure the fiber optic cable to the second connection end, the one or more breakaway tabs joined to the first connection end and the second connection end using a break area that is structurally weaker than the carrier and the breakaway tabs.

20 Claims, 4 Drawing Sheets

METHOD AND SYSTEM FOR A FIBER OPTIC SENSOR

BACKGROUND OF THE INVENTION

The field of the invention relates generally to bearings, and more specifically, to a method and a system for a fiber optic sensing device for detecting multiple parameters of a bearing.

The life of a ball bearing depends heavily on its operating thrust load. If loads are too high, bearing life may be significantly reduced. Likewise, when bearing loads are too low, skidding can occur leading to premature failure. Rotor thrust control through changing engine cavity pressure is one method of managing rotor thrust. To make changes effectively, in either an active or passive method, an accurate and reliable measurement instrument is needed.

Fiber optic sensors offer a reliable means of monitoring thrust. In addition, fiber optic sensors are substantially immune to the effects of electromagnetic interference (EMI), which offers a significant advantage over electrically-based strain gages, which tend to pick-up significant signal distortion during engine operation.

Thrust sensors on an engine enable an operator to integrate control schemes to minimize and/or mitigate adverse thrust reactions during engine operation, which can lead to extended bearing life, less downtime for engine overhauls, and a potential means for monitoring bearing health in real time. Strain gages are typically used to perform bearing thrust loading measurement. However, electrical resistance strain gage technology of the existing art encounters several problems and limitations. One problem encountered is that the strain gage indicated output is dependent upon its temperature environment at any thrust load, thus inducing errors into the measurement. In addition, the strain gages are subject to mechanical fatigue failure and, thus, loss of signal. Another problem is that the strain gages are subject to electrical magnetic interference or other induced electrical noise, thus inducing errors into the thrust load measurement. Yet another problem encountered is that the strain gages are not an absolute measurement, as they require an electrical tare balance and other thermal compensations. Also, the electrical resistance-based strain gage possesses a calibration constant known as the gage factor, which varies as a function of temperature and can produce an error in the indicated thrust measurement. The conventional technique also does not effectively address the issues relating to mitigation of thrust load on the bearings.

BRIEF DESCRIPTION OF THE INVENTION

In one embodiment, a fiber optic sensor includes a fiber optic cable and a carrier including a first connection end and a second connection end joined together by one or more breakaway tabs, the first connection end including a first fiber attach point configured to secure a distal end of the fiber optic cable to the first connection end, the second connection end including a second fiber attach point configured to secure the fiber optic cable to the second connection end, the one or more breakaway tabs joined to the first connection end and the second connection end using a break area that is structurally weaker than the carrier and the breakaway tabs.

In another embodiment, a method of assembling a fiber optic sensor assembly includes coupling a fiber optic sensor to a first portion of a carrier, applying a predetermined tension force to the fiber optic sensor, and coupling the fiber optic sensor to a second portion of the carrier while maintaining the tensile force. The method also includes coupling the first and second portions of the carrier to separate bearing components and separating the first and second portions of the carrier such that the fiber optic sensor remains under tension coupled between the first portion of a carrier and the second portion of the carrier.

In yet another embodiment, a fiber optic sensor carrier includes a first connecting end, a second connecting end and a body extending in a longitudinal direction between the first and second connecting ends. The body includes a first fiber attach point proximate the first connecting end, a second fiber attach point proximate the second connecting end, a lateral aperture extending through the body, and one or more breakaway tabs spanning the lateral aperture, each of the tabs including a break hinge between the tab and the body, the break hinge configured to be structurally weaker than the body and the tabs such that application of a bending force to the tab causes the break hinge to separate the tab from the body.

BRIEF DESCRIPTION OF THE DRAWINGS

FIG. 1 is a schematic diagram of a fiber-optic based measurement system in accordance with an exemplary embodiment of the invention;

FIG. 2 is a plan view of a carrier in accordance with an exemplary embodiment of the present invention that may be used with the measurement system shown in FIG. 1;

FIG. 3 is a perspective view of carrier shown in FIG. 2 secured to a bearing housing in accordance with an exemplary embodiment of the present invention; and FIG. 4 is a flow chart of a method for assembling a fiber optic sensor assembly.

DETAILED DESCRIPTION OF THE INVENTION

Embodiments of the present invention describe in detail sensor body geometry developed to extract rotor thrust measurements in a robust fashion from, for example, a spring finger housing.

Embodiments of the present invention include a carrier designed specifically to hold a fiber optic sensor (fiber Bragg grating) that provides for separating both thrust and temperature measurements within a bearing housing. The carrier body permits reliably and robustly attaching the fiber sensor to the bearing housing structure in a repeatable fashion.

A fiber optic sensor is held in place at two point locations along the central axis of the carrier. The purpose of the carrier is to serve as a medium between the fiber optic sensor and the bearing housing. The carrier provides a repeatable means of pre-tensioning the fiber optic sensor line so that the fiber Bragg grating always operates in tension (no matter the direction of the thrust load vector). Through the use of a compensation fiber optic sensor, the temperature-induced shift in wavelength of the thrust sensor can be removed from the signal.

As described, the compensation fiber has two attachment points. Having two distinct points of attachment necessitates having pretension on the compensation fiber to measure low temperatures (below assembly temperature) because the thermal expansion coefficient of the fiber is often times lower then that of the carrier. In various embodiments, the compensation fiber is adhered to the carrier along its length such that the epoxy adhering the compensation fiber to the carrier effectively transmits the tensile and compressive loading of the carrier during temperature changes to the compensation fiber.

In such an embodiment, two separate attachment points are not needed and the compensation fiber is attached to the carrier directly.

The sensor carrier may in some circumstances have breakaway features that isolate the carrier body from the strain field and minimize the stress magnitude in the carrier that allows for extended life of the metal carrier after application of the carrier to the spring housing and removal of the break-away features.

Figure 1:
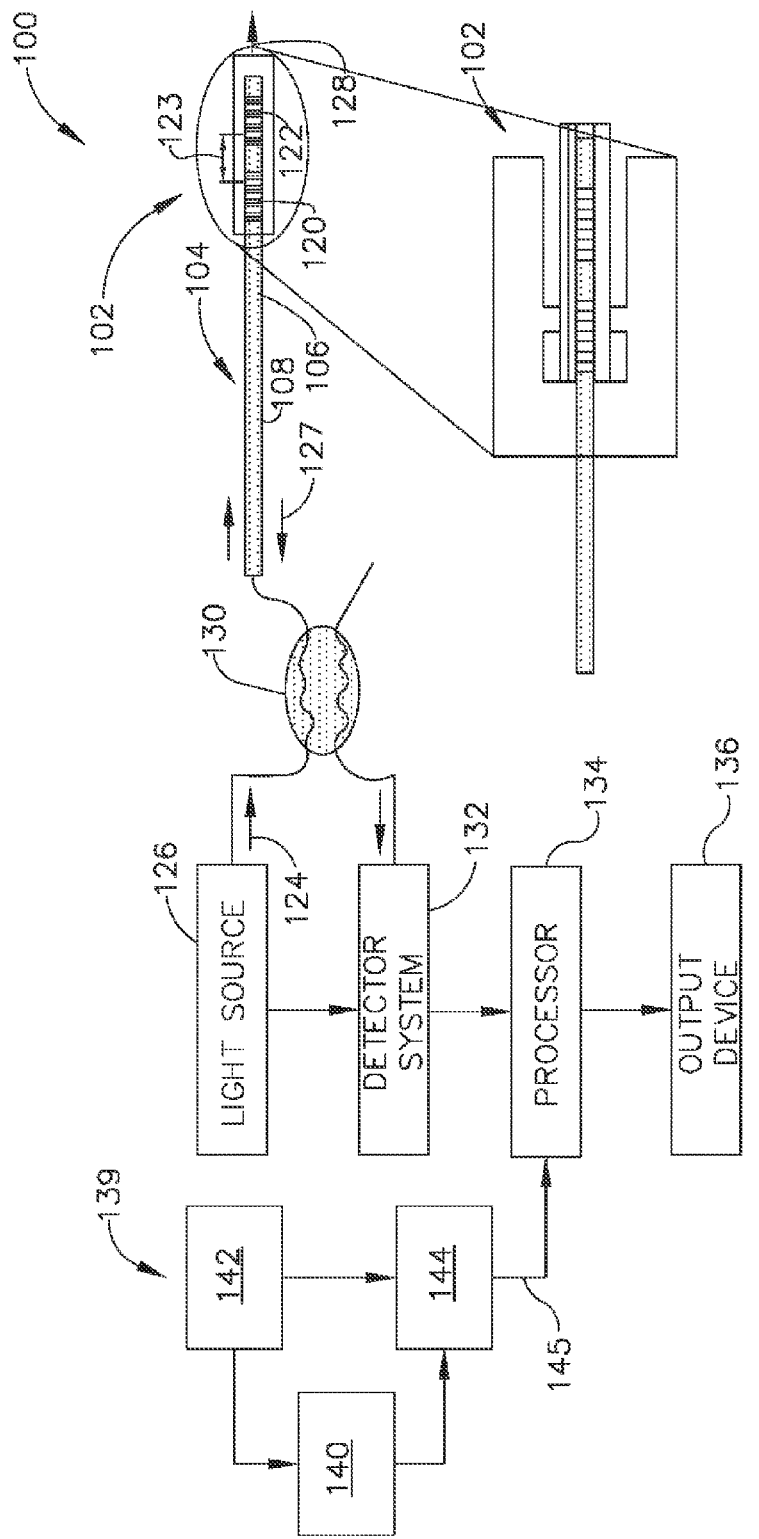
FIGS. 1-4 show exemplary embodiments of the method and system described herein.

FIG. 1 is a schematic diagram of a fiber-optic based measurement system 100 in accordance with an exemplary embodiment of the invention. In the exemplary embodiment, system 100 includes one or more fiber optic sensors 102. Although illustrated and described as a thrust load sensor for a bearing, measurement system 100 may be used to measure any physical parameter as described herein. Each sensor 102 includes a fiber optic cable 104 having aperiodic refractive index modulation. The fiber optic cable 104 includes a core 106 and a cladding 108 that is disposed circumferentially about the core 106. A series of grating elements 120, 122 are spaced apart by a predetermined distance 123 and disposed within the core 106 and are configured to reflect in phase, wavelengths of light corresponding to a grating period of the grated elements 120, 122. The cladding 108 provides for near total internal reflection of light within the cable 104, thereby allowing light to be transmitted by and axially through fiber optic cable 104. The plurality of grating elements 120, 122 have an index of refraction different that of core 106. Although only two grating elements 120, 122 are illustrated, in other embodiments, more than two grating elements may be used. During operation, an input light 124 signal is provided from a light source 126 to fiber optic cable 104 and a portion of the input light signal 127 is reflected by the grating elements 120, 122 in phase and corresponding to certain wavelengths of light, while remaining wavelengths are transmitted as represented by a transmitted signal 128. The index of refraction of the grating elements 120, 122 and distance between the grating elements 120, 122 define the wavelength of light reflected in phase by the grating elements 120, 122.

The measurement system 100 also includes an optical coupler 130 configured to regulate input light signal 127 from light source 126 and also the reflected signals from fiber optic cable 104. Optical coupler 130 directs the appropriate reflected signals to a detector system 132, such as a photo detector system, and the like. The detector system 132 receives the reflected optical signals from the cable 104 and provides an output signal to a processor 134. The processor 134 is configured to analyze the embedded information in the output signal from the detector system 132 and estimate a condition of a plurality of parameters of a bearing housing (not shown in FIG. 1) based upon a diffraction peak generated from the plurality of grating elements 120, 122 of the fiber optic cable 104. Parameters may include temperature, strain, pressure, vibrations, or the like. In the exemplary embodiment, fiber optic cable 104 generates multiple strong diffraction peaks, thereby facilitating segregation of various parameters. First grating element 120 is configured to reflect a first wavelength of light in phase. The reflected optical signal from the grating element 120 may be indicative of temperature of the bearing housing. Also, the second grating element 122 is configured to reflect a second wavelength of light in phase. The reflected optical signal from the grating element 122 may be indicative of strain on the bearing housing. In one example, the grating element 122 may be an apodized short period grating. An output signal indicative of the parameters of the bearing housing may be transmitted from the processor 134 to an output device 136, such as a controller, personal computer, personal device, laptop, or server. The output information may be used to address concerns or effectuate changes in the bearing housing.

In one embodiment, system 100 includes a sensor compensation system 139 including a compensation sensor 140 coupled in light communication with a light source 142 and a detector system 144. An output 145 of detector system 144 is communicatively coupled to processor 134. System 139 is configured to measure a parameter in a vicinity of sensor 102 to provide a signal that can be used to modify the output of sensor 102 to compensate for the effects of the parameter measured by compensation sensor 140.

Figure 2:
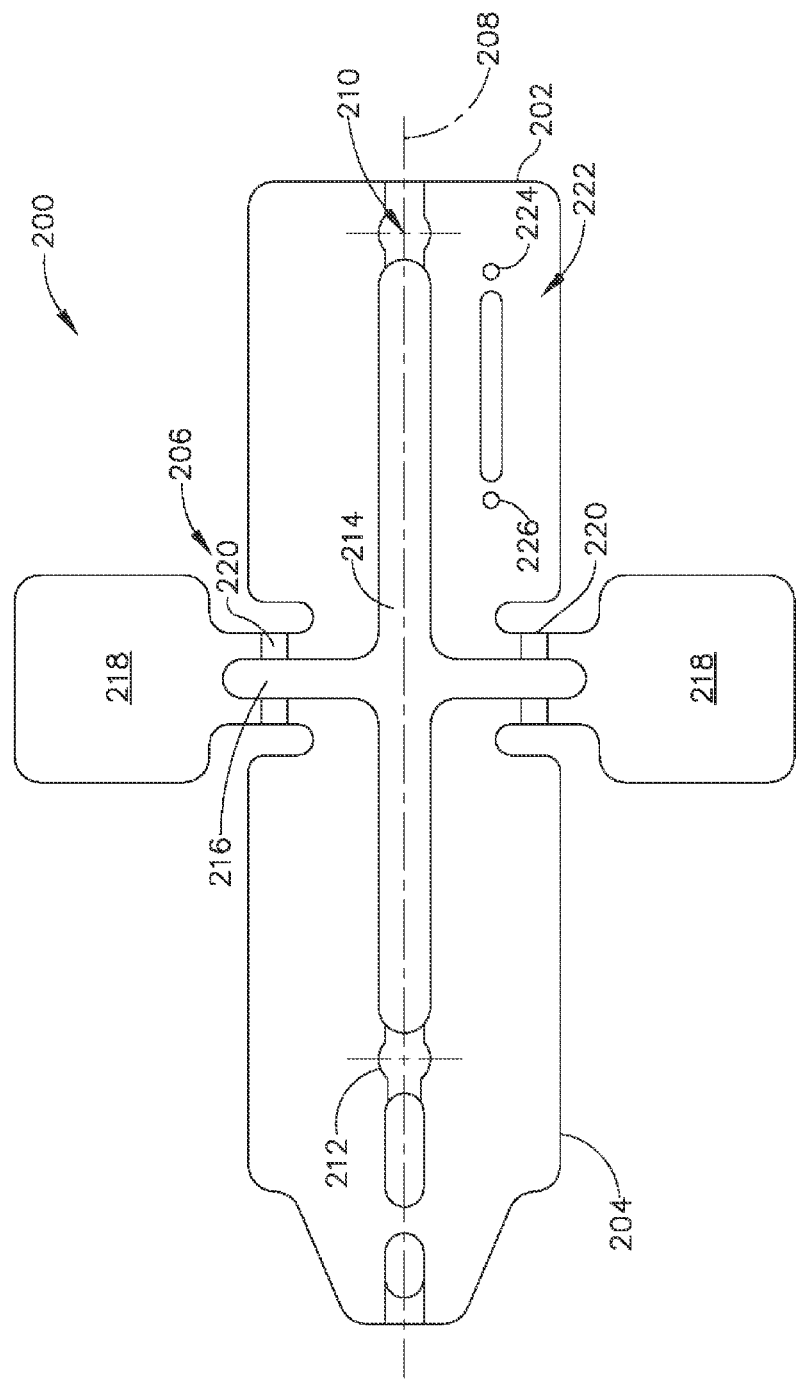

FIG. 2 is a plan view of a carrier 200 in accordance with an exemplary embodiment of the present invention that may be used with measurement system 100 (shown in FIG. 1). In the exemplary embodiment, carrier 200 includes a first connecting end 202, a second connecting end 204, and a body 206 extending along a longitudinal axis 208 between first connecting end 202 and second connecting end 204. Body 206 includes a first fiber attach point 210 configured to receive and secure a distal end of fiber optic cable 104 proximate first connecting end 202. A second fiber attach point 212 is configured to receive and secure fiber optic cable 104 proximate second connecting end 204. Second fiber attach point 212 is configured to permit fiber optic cable 104 to feed through unbroken to exit carrier 200 and continue on to optical coupler 130. In various embodiments, carrier 200 may include an elongate aperture 214 extending through body 206 and extending longitudinally between first fiber attach point 210 and second fiber attach point 212. In various other embodiments, carrier 200 includes a lateral aperture 216 extending through body 206 in a lateral direction with respect to axis 208. One or more breakaway tabs 218 span lateral aperture 216. Each tab 218 includes a break hinge 220 between tab 218 and body 206. Each break hinge 220 is configured to be structurally weaker than body 206 and tabs 218 such that an application of a bending force to tab 218 causes break hinge 220 to fail allowing a separation of tab 218 from body 206.

In various embodiments, carrier 200 also includes a compensation fiber optic cable attachment 222. Fiber optic cable attachment 222 includes a first compensation fiber attach point 224 and a second compensation fiber attach point 226 configured to receive and secure a compensation fiber optic cable (not shown in FIG. 2). Both first compensation fiber attach point 224 and second compensation fiber attach point 226 are positioned on first connecting end 202 or second connecting end 204. The compensation fiber optic cable does not span lateral aperture 216 and therefore is unaffected by the parameter measured by fiber optic cable 104. For example, fiber optic sensor 102 may be measuring a thrust load on a bearing using fiber optic cable 104. However, the measurement of thrust may also be affected by a temperature change proximate fiber optic cable 104. The compensation fiber optic cable is also affected by the temperature change proximate fiber optic sensor 102, but can not measure the thrust load being measuring by fiber optic sensor 102 using fiber optic cable 104. Therefore, the compensation fiber optic cable can be used to temperature compensate the thrust measurement from fiber optic cable 104.

During assembly, fiber optic cable 104 is feed through second fiber attach point 212 and attached to first fiber attach point 210 is an adhesive, such as, but not limited to, epoxies. A tension is applied to fiber optic cable 104 and fiber optic cable 104 is secured in second fiber attach point 212 using the adhesive such that tension is maintained on fiber optic cable 104.

During installation, first connecting end 202 is coupled to a first portion of a bearing housing (not shown in FIG. 2) and second connecting end 204 is coupled to a second portion of the bearing housing. The first and second portions of the bearing housing are selected such that a thrust load on the bearing may be sensed by fiber optic sensors 102 through first connecting end 202 and second connecting end 204. In various embodiments, connecting ends 202 and 204 may by coupled using for example, welding, brazing, or adhesive. When first connecting end 202 and second connecting end 204 are coupled to the bearing housing, tabs 218 may be broken away from body 206 to activate fiber optic sensor 102. Any relative movement of first connecting end 202 and second connecting end 204 will be measurable by fiber-optic based measurement system 100 as a shift in the frequency of the light reflected back from grating elements 120, 122.

Figure 3:
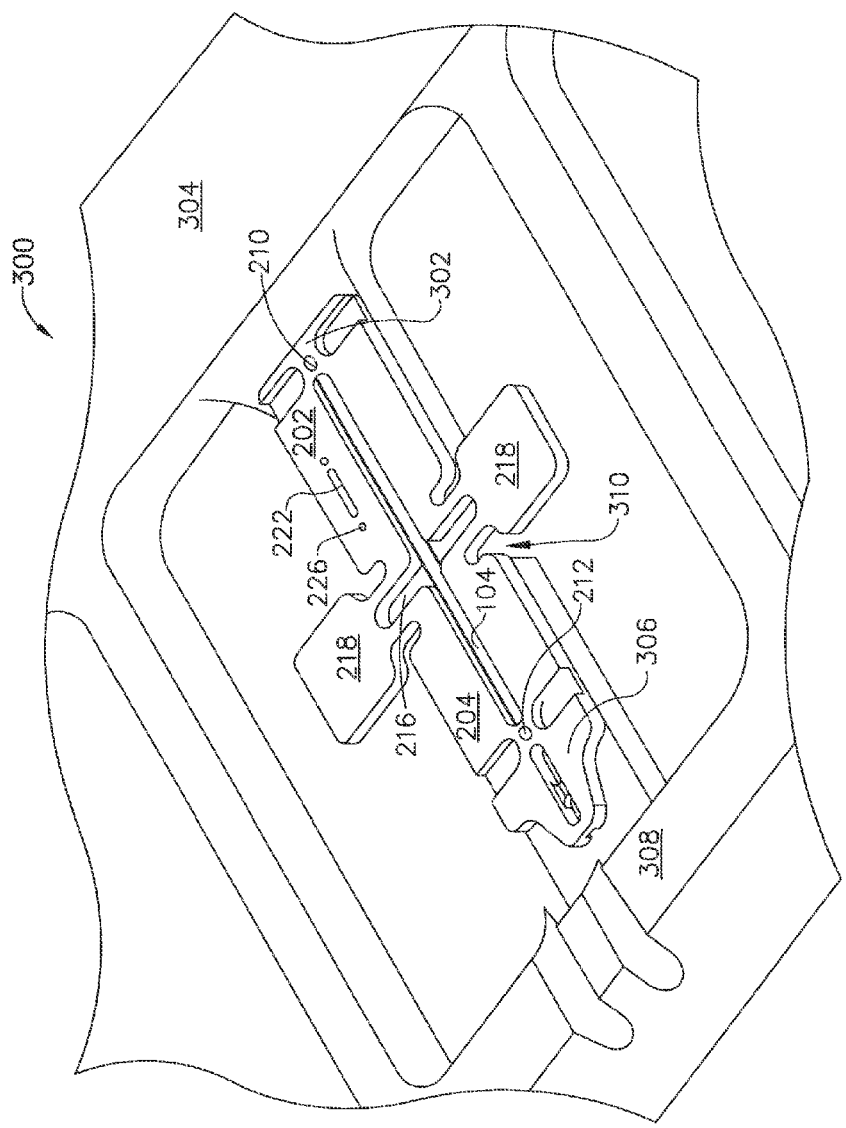

FIG. 3 is a perspective view of carrier 200 (shown in FIG. 2) secured to a bearing housing 300 in accordance with an exemplary embodiment of the present invention. In the exemplary embodiment, carrier 200 may be mounted to bearing housing 300 in any suitable configuration, arrangement, fashion, and/or by any suitable structure. In the exemplary embodiment, carrier 200 is secured to bearing housing 300 between a first protrusion 302 on a first face 304 of bearing housing 300 and a second protrusion 306 on second face 308 of bearing housing 300. First protrusion 302 and second protrusion 306 are separated by a gap 310, which is spanned by carrier 200 during installation. First protrusion 302 and second protrusion 306 are each located on separate halves of bearing housing 300 such that first protrusion 302 and second protrusion 306 are displaced axially when bearing housing 300 experiences a thrust loading. Although the thrust loading may be compressive or tensile, carrier 200 ensures fiber optic cable remains in tension during design thrust loading.

As the bearing housing 300 is put into either tensile or compressive loading, an axial dimension of the housing 300 is changed, for example from about 0 to +/− about several mils. This axial dimensional change of bearing housing 300 causes a loading (or deflection) on fiber optic sensor 102. The loading (or deflection) on fiber optic sensor 102 causes a shift in the wavelength of light reflected by the fiber optic sensor 102. By detecting the shift in the wavelength of the light reflected from the fiber optic sensor 102, the loading on the bearing housing 300 can be detected by detector system 132 and determined by the processor 134.

Figure 4:
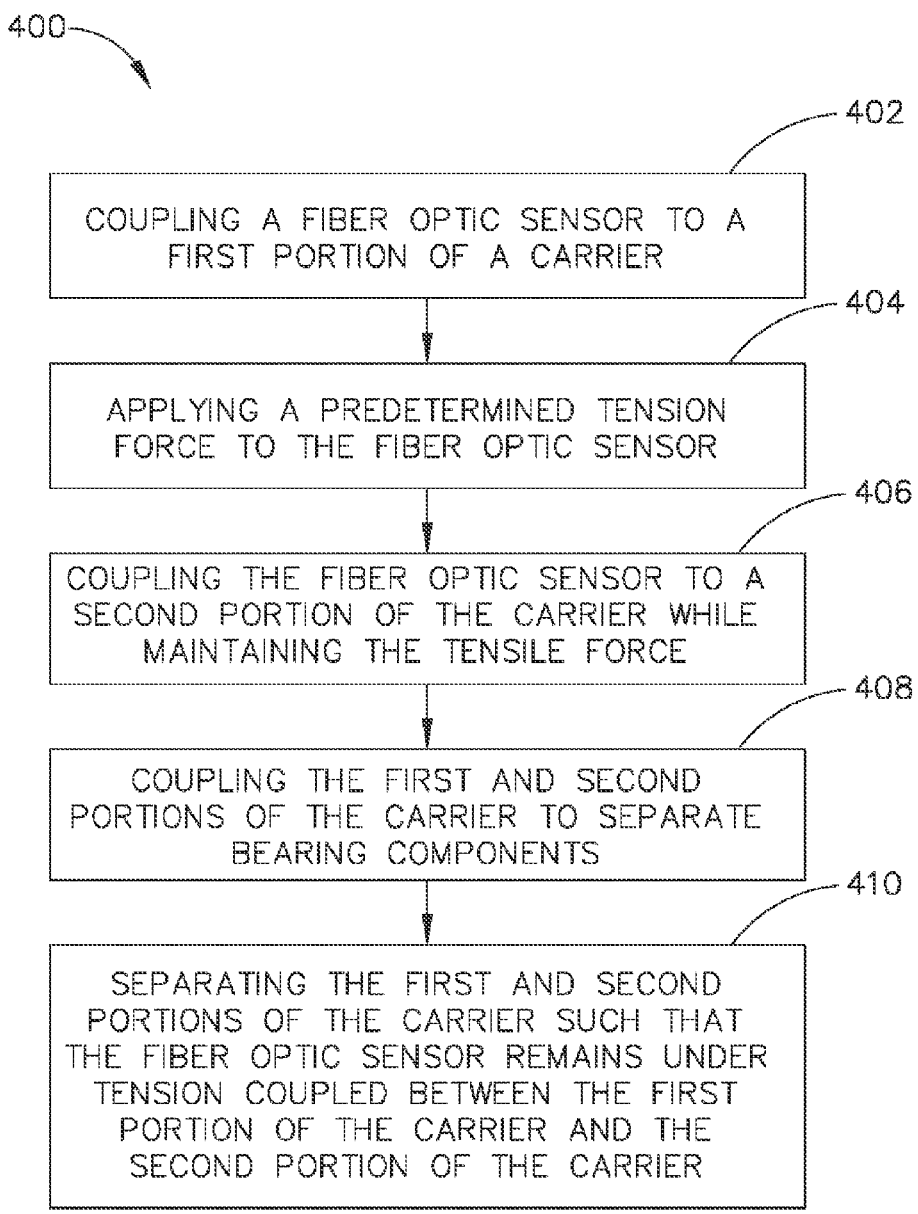

FIG. 4 is a flow chart of a method 400 for assembling a fiber optic sensor assembly. In the exemplary embodiment, method 400 includes coupling 402 a fiber optic sensor to a first portion of a carrier, applying 404 a predetermined tension force to the fiber optic sensor, and coupling 406 the fiber optic sensor to a second portion of the carrier while maintaining the tensile force. Method 400 also includes coupling 408 the first and second portions of the carrier to separate bearing components and separating 410 the first and second portions of the carrier such that the fiber optic sensor remains under tension coupled between the first portion of a carrier and the second portion of the carrier.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 134, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is mounting a fiber optic load sensor in a repeatable manner in a robust and reliable sensor housing and monitoring the thrust load using an onboard compensated measurement. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of mounting a fiber optic sensor provides a cost-effective and reliable means for providing a repeatable and robust sensor package. More specifically, the method and system described herein facilitate maintaining a proper tension on a fiber optic sensing cable until after installation of the sensor. In addition, the above-described method and system facilitate compensating the fiber optic sensor output using an onboard compensation fiber optic sensor. As a result, the method and system described herein facilitate automatically monitoring and compensating fiber optic sensors in a cost-effective and reliable manner.

The assemblies, bearings, and methods described and/or illustrated herein in connection with a specific assembly for being secured to a bearing housing of a gas turbine engine. However, it should be understood, that such sensing elements could be used in many alternative securing arrangements. Therefore, the manner of securing the sensing element to the bearing housing is an exemplary configuration and the sensing element could be used in connection with other securing assemblies.

Exemplary embodiments of assemblies, bearings, and methods are described and/or illustrated herein in detail. The assemblies, methods, and bearings are not limited to the specific embodiments described and/or illustrated herein, but rather, components of each assembly and bearing, as well as steps of each method, may be utilized independently and separately from other components and/or steps described and/or illustrated herein. Each component and/or step can also be used in combination with other components and/or steps.

When introducing elements/components/etc. of the assemblies, bearings, and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A fiber optic sensor system comprising:
a fiber optic cable; and
a carrier comprising a first connection end and a second connection end joined together by one or more breakaway tabs, said first connection end comprising a first fiber attach point configured to secure a distal end of said fiber optic cable to said first connection end, said second connection end comprising a second fiber attach point configured to secure said fiber optic cable to said second connection end, said one or more breakaway tabs joined to said first connection end and said second connection end using a break area that is structurally weaker than said carrier and said breakaway tabs.

2. A sensor in accordance with claim 1, wherein the fiber optic cable comprises a core having grating elements that are spaced apart by a predetermined distance and are configured to reflect wavelengths of light corresponding to a grating period of the grated elements, said fiber optic cable further comprising a cladding at least partially surrounding said core.

3. A sensor in accordance with claim 1, wherein the fiber optic cable comprises a plurality of fiber Bragg grating elements.

4. A sensor in accordance with claim 1, wherein said carrier comprises a body extending in a longitudinal direction between said first connection end and said second connection end, said body comprising:
a first fiber attach point proximate said first connecting end;
a second fiber attach point proximate said second connecting end; and
an elongate aperture extending through said body and extending longitudinally between said first fiber attach point and said second fiber attach point.

5. A sensor in accordance with claim 4, further comprising:
a lateral aperture extending through said body; and
one or more breakaway tabs spanning said lateral aperture, each of said tabs including a break hinge between said tab and said body, said break hinge configured to be structurally weaker than said body and said tabs such that an application of a bending force to said tab causes said break hinge to separate said tab from said body.

6. A sensor in accordance with claim 1, further comprising a second fiber optic sensor comprising a fiber optic cable coupled to only one of said first connection end or said second connection end.

7. A sensor in accordance with claim 6, wherein said second fiber optic sensor comprises a plurality of fiber Bragg gratings.

8. A sensor in accordance with claim 6, wherein and output of said second fiber optic sensor is used to compensate an output of said fiber optic cable.

9. A method of assembling a fiber optic sensor assembly, said method comprising:
coupling a fiber optic sensor to a first portion of a carrier;
applying a predetermined tension force to the fiber optic sensor;
coupling the fiber optic sensor to a second portion of the carrier while maintaining the tensile force;
coupling the first and second portions of the carrier to separate bearing components; and
separating the first and second portions of the carrier such that the fiber optic sensor remains under tension coupled between the first portion of a carrier and the second portion of the carrier.

10. A method in accordance with claim 9 wherein separating the first and second portions of the carrier comprises removing one or more tabs rigidly coupling the first portion of the carrier to the second portion of the carrier.

11. A method in accordance with claim 9 wherein separating the first and second portions of the carrier comprises applying a bending force to the one or more tabs.

12. A method in accordance with claim 9 wherein separating the first and second portions of the carrier comprises applying a bending force to the one or more tabs about a weakened break hinge dividing the one or more tabs from the first and second portions.

13. A method in accordance with claim 9 wherein coupling the first and second portions of the carrier to separate bearing components comprises coupling the first portion of the carrier to a protrusion on a first face of a bearing housing and coupling the second portion of the carrier to a protrusion on a second face of the bearing housing.

14. A fiber optic sensor carrier comprising:
a first connecting end;
a second connecting end; and
a body extending in a longitudinal direction between the first and second connecting ends, said body comprising:
a first fiber attach point proximate said first connecting end;
a second fiber attach point proximate said second connecting end;
a lateral aperture extending through said body; and
one or more breakaway tabs spanning said lateral aperture, each of said tabs including a break hinge between said tab and said body, said break hinge configured to be structurally weaker than said body and said tabs such that application of a bending force to said tab causes said break hinge to separate said tab from said body.

15. A system in accordance with claim 14, wherein said first connecting end is configured to couple to a first portion of a bearing housing.

16. A system in accordance with claim 15, wherein said second connecting end is configured to couple to a second portion of a bearing housing.

17. A system in accordance with claim 14, further comprising a compensation connection positioned on only one of said first connecting end or second connecting end.

18. A system in accordance with claim 14, wherein said first connecting end is separated from said second connecting end when said one or more breakaway tabs are separated from said body.

19. A system in accordance with claim 14, further comprising an elongate aperture extending through said body and extending longitudinally between said first fiber attach point and said second fiber attach point.

20. A system in accordance with claim 14, wherein said first fiber attach point is configured to receive and secure a distal end of a fiber optic cable and said second fiber attach point is configured to feed the fiber optic cable through said carrier and maintain the fiber optic cable in tension.

* * * * *